(12) United States Patent
Karlsson et al.

(10) Patent No.: US 6,836,827 B2
(45) Date of Patent: Dec. 28, 2004

(54) DELAY CACHE METHOD AND APPARATUS

(75) Inventors: Magnus Karlsson, Mountain View, CA (US); Mallik Mahalingam, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 244 days.

(21) Appl. No.: 10/217,698

(22) Filed: Aug. 13, 2002

(65) Prior Publication Data

US 2004/0034744 A1 Feb. 19, 2004

(51) Int. Cl.$^7$ .............................................. G06F 12/00
(52) U.S. Cl. ....................... 711/133; 711/136; 711/137
(58) Field of Search ................................. 711/118, 133, 711/136, 137; 707/103 R

(56) References Cited

U.S. PATENT DOCUMENTS 6,292,880 B1 * 9/2001 Mattis et al. ............... 711/216
6,510,494 B1 * 1/2003 Arimilli et al. ............. 711/137

* cited by examiner

Primary Examiner—Pierre M. Vital

(57) ABSTRACT

Delayed caching receives an evaluation interval to delay updating the objects stored in a delayed cache, delays a time period corresponding to the evaluation interval, and updates the objects stored in the contents of the delayed cache when the time period delay has completed. The configuration operation for the delayed cache selects a time interval to sample a trace having object access frequencies for objects stored in a cache, creates a first working set of objects accessed during the time interval and a second working set of objects accessed during a subsequent time interval based on the historical trace, determines that the difference between the objects contained in the first and second working sets does not exceed a maximum threshold with the selected time interval, and sets a evaluation interval for evaluating the contents of the cache to the selected time interval.

20 Claims, 5 Drawing Sheets

DELAY CACHE METHOD AND APPARATUS

BACKGROUND OF THE INVENTION

Content delivery networks (CDN) are increasingly used to deliver web sites and other content with reduced client-perceived latency. These conventional CDNs are dedicated to serving content using a distributed architecture spread over large geographic areas and sometimes spanning the globe. The techniques used to accelerate content distribution can generally be categorized as replica placement algorithms or caching algorithms.

Replica placement algorithms tend to be evaluated infrequently with many hours or days elapsing between evaluations. As the evaluations are made infrequently, the replica placement algorithms can use much more complex and elaborate calculations. Depending on the network capacity and size, nodes using the replica placement algorithm usually have time to share the information contained in node with other nodes on the network.

Sharing content once a week, daily, or every several hours can be done using replica replacement algorithms without impacting processing and performance. The replica placement information describes the location of an object on different nodes on a network and facilitates increased use of the content on nearby nodes. Retrieving content from a node generally incurs less delay when compared with retrieving the original content over long-distances or from slower storage devices. Unfortunately, the replica placement algorithms often use a centralized network design that does scale well for rapid growth and expansion.

Caching algorithms offer more scalability but lack the performance offered by replica placement algorithms. Conventional caching is evaluated after every access potentially causing the contents of the cache to change rapidly. Notifying other nodes on the contents of the cache cannot be done efficiently as it would involve large amounts of bandwidth. Even if this information were distributed at regular intervals, the cache content information would become stale quickly as cache's content often changes quickly. Like replica placement algorithms, latency can be increased significantly if the content is not in the cache and must be retrieved over potentially long-distances or from slower servers.

DETAILED DESCRIPTION

A delayed cache designed and operated in accordance with the present invention has many advantages over conventional cache used in computer and other systems. Accordingly, at least one or more of the following advantages can be realized by the various implementations of the invention. For example, delayed cache does not evaluate cache contents evaluations each access thus reducing processing overhead. Instead, caching algorithms used by the delayed cache update the contents of the cache only after the end of an evaluation interval.

This delay between evaluations of the delayed cache also facilitates propagating the contents of the delayed cache to other delayed caches connected over a network. Using this propagated information, requests for objects and other content not available in one cache are often found in a nearby delayed cache having replicas of the original object or content. The evaluation interval or delay between evaluations of the cache is selected large enough to reduce the amount processing for delayed cache on a network to maintain replica information from many different delayed cache yet brief enough to ensure the contents of the delayed cache adapts quickly enough to changes in the workload. Many other advantages of the present invention are also possible for each of the various implementations described in further detail herein.

Figure 1:
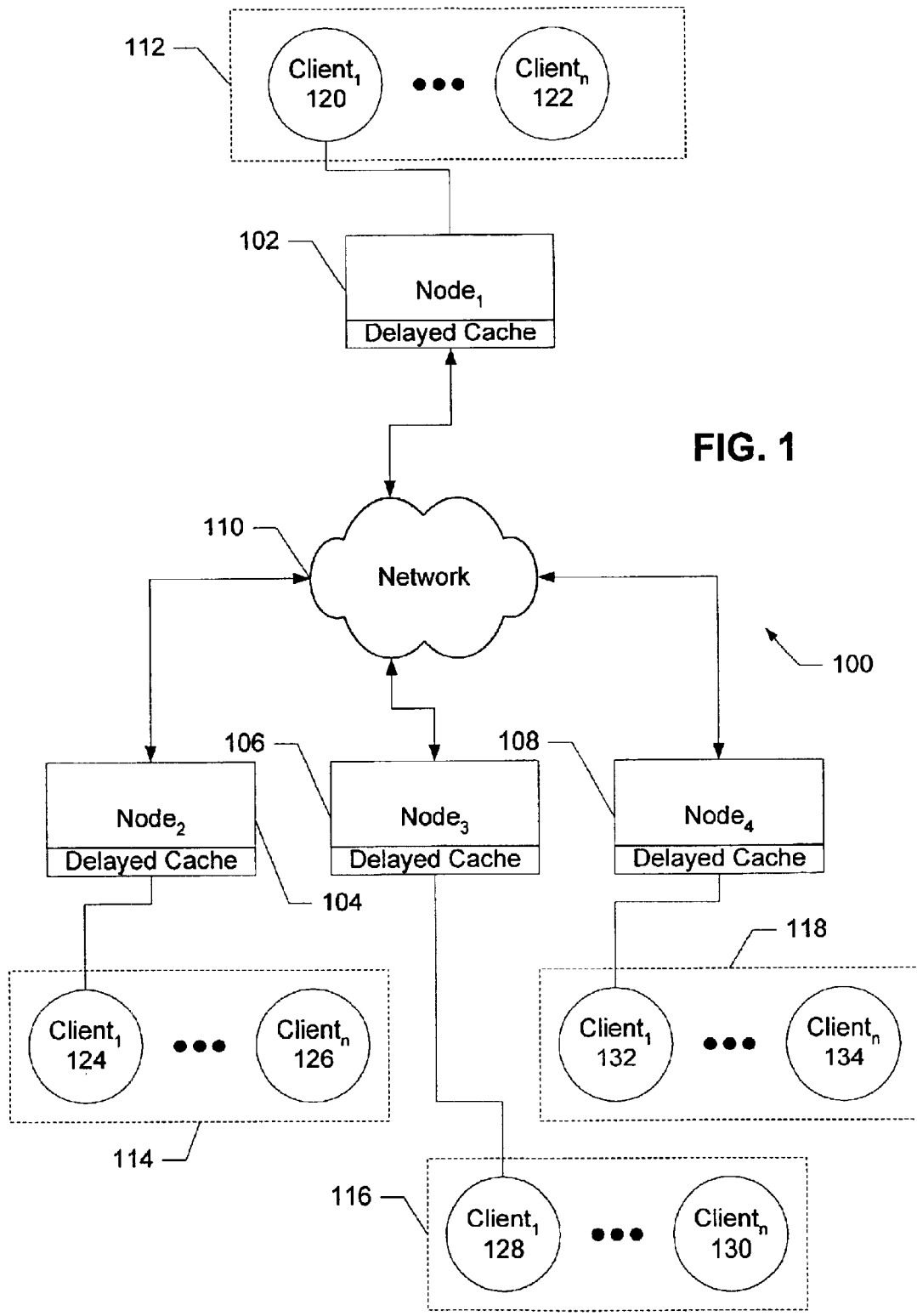
FIG. 1 is a block diagram of a network system using delayed cache and delayed caching operations in accordance with one implementation of the present invention.

FIG. 1 is a block diagram of a network system 100 (hereinafter, system 100) using delayed cache and delayed caching operations for improving system 100 performance. System 100 includes a node 102, a node 104, a node 106, and a node 108 each having delayed cache designed in accordance with the present invention and operatively coupled together over a network 110. Client group 112, client group 114, client group 116, and client group 118 have clients making requests for objects and other content through node 102, node 104, node 106, and node 108. System 100 can be any system that caches information and represents web based systems, telecommunication systems, Internet and intranet systems, distribute storage systems, and distributed processing systems. For example, objects stored on system 100 can represent data aggregates in the form of entire web-sites, directories, or single documents.

Multiple clients in each client group can make requests in parallel or in sequence. In the implementation depicted in FIG. 1, client 120 through client 122, client 124 through client 126, client 128 through client 130, and client 132 through client 134 make direct requests for objects and content through node 102, node 104, node 106, and node 108 respectively. Nodes associated with system 100 directly fulfill requests for objects and content directly when the node's delayed cache contains the information corresponding to the request. Alternatively, nodes may also fulfill requests by accessing delayed cache of neighboring nodes on behalf of the requesting client.

For example, client 122 in client group 112 requests an object not presently associated with node 102 or the delayed cache of node 102. Node 102 uses an object list identifying the contents of other delayed cache on network 100. Node 102 determines through the object list that delayed cache of node 104 contains the requested object and then either obtains the requested object from delayed cache in node 104 on behalf of client 122 or redirects client 122 to delayed cache in node 104. By delaying the evaluation of delayed cache in accordance with the present invention, the object list containing the list of replica objects in neighboring cache is kept up to date. Updating the object list at a low frequency reduces the likelihood that the network in system 100 would be overloaded with object list and replica object information traffic.

Figure 2:
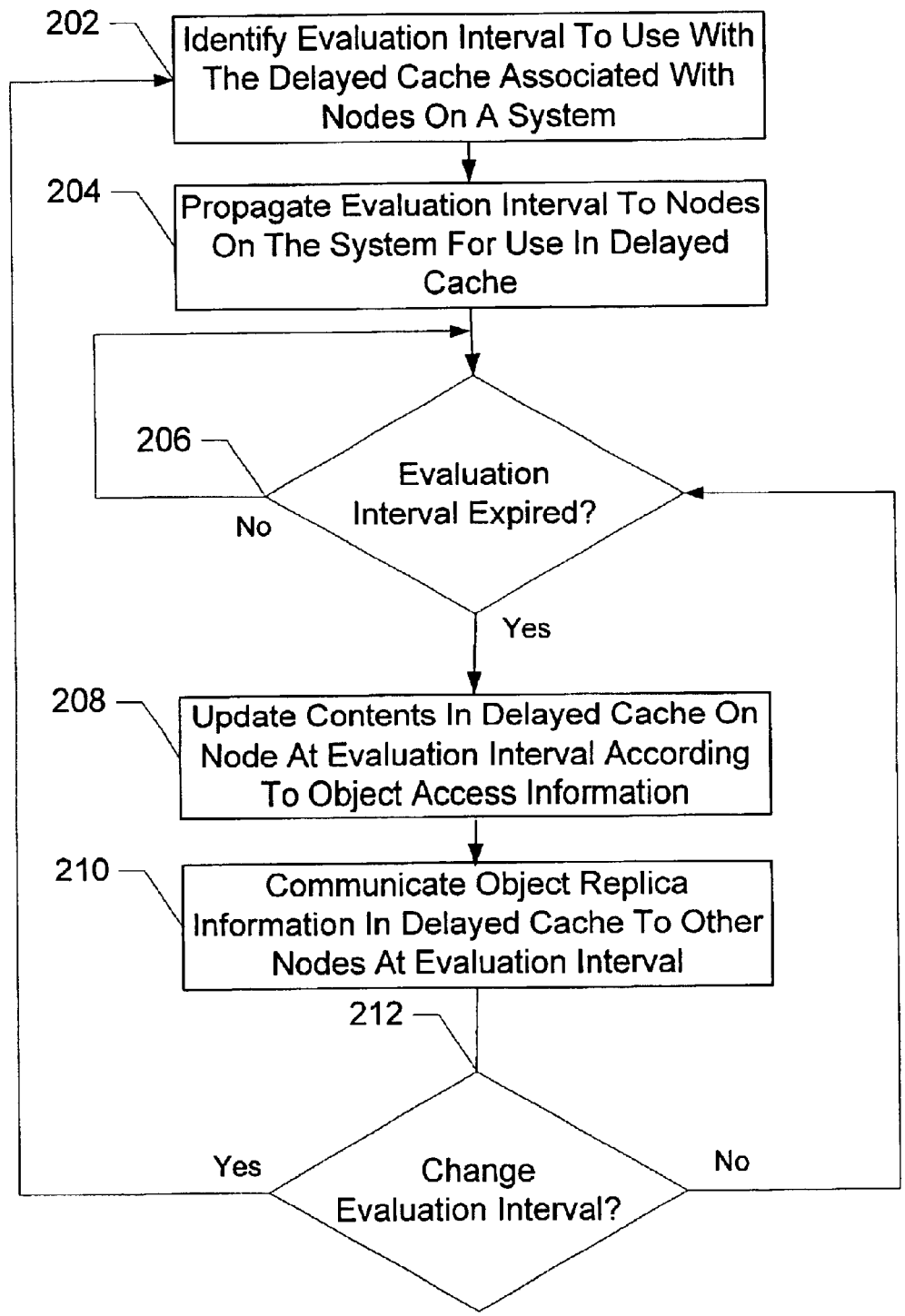
FIG. 2 is a flow chart diagram depicting the operations associated with operating a delayed cache designed in accordance with one implementation of the present invention.

FIG. 2 is a flow chart diagram depicting the operations associated with operating a delayed cache designed in accordance with one implementation of the present invention. Delayed cache records access information and updates the cache contents after an evaluation interval elapses rather than performing an evaluation each time the cache is accessed. Generally, new objects are fetched from a predetermined location and stored in the delayed cache if there is adequate space. If the delayed cache is full, as is often the case, then some objects are evicted in accordance with the cache operation and replaced with new objects. Contents held in delayed cache during the evaluation interval are published to other nodes through an object list or other directory mechanism.

In one implementation, an evaluation interval is identified and used by the delayed cache associated with each of the nodes on the system (202). The same evaluation interval can be used for each node on the system when the cache is used by the same or similar applications on each node in system 100. In an alternate implementation, different evaluation intervals are used for the delayed cache associated with each node on the system when the nodes are hosting different applications or the same application needs a different evaluation interval depending on the particular node.

The evaluation interval used in the delayed cache makes the cache less adaptive to immediate changes in data requests because the delayed cache contents are not updated each access. However, object lists containing additional information about the cache contents in neighboring nodes facilitates rapid access to more objects and information. In one implementation, the evaluation interval is large enough to minimize overhead of transmitting these object lists to various nodes yet short enough that the requests for objects are often found in the delayed cache.

The evaluation interval selected is then propagated to different nodes on the system for use by the various different delayed caches (204). This value can be distributed using traditional multicast or non-multicast technologies over traditional TCP/IP networks or even using peer-to-peer type communication technologies.

A timer associated with the delayed cache delays a time interval corresponding to the evaluation interval (206). When the time interval has completed, the contents of the cache is evaluated according to a caching technique or other similar logic using, in part, object access information. This object access information accumulated and stored during the time interval records which objects and content have been requested and accessed. Objects and content change according to the object access information and the type of caching used (208). For example, a least-recently used (LRU) caching determines the objects and content least recently used based on historical object access information stored over the most recent time or evaluation interval. The LRU caching is performed at the end of each evaluation interval rather than for each access. Other caching algorithms can also be used including Greedy Dual (GD) Caching and Greedy Dual Size (GDS) Caching.

At each evaluation interval, the cache is updated and object replica information in delayed cache is communicated to other nodes (210). Object replica information facilitates other nodes referencing neighboring nodes to obtain requested objects and content rather than retrieving information from an original source that may be further away. In one implementation, object replica information in other nodes is used to locate the nearest copy of an object or content when multiple replicas of the requested object or content are available. Accessing the nearest delayed cache with the object or content further reduces the time frame to access information and improves the user's perceived response time associated with the system.

Alternate implementations can use various criteria for selecting object replica information from different nodes on the network. In one implementation, the closest node having the lowest processing load can be selected to provide object replica information. Yet another implementation can request object replica information from several nodes and accept the information from the first node to respond with the information. Many other criteria for selecting a node with object replica can also be used.

Occasionally, it is necessary to determine whether the evaluation interval needs to be adjusted or changed (212). The evaluation interval can be changed when the application being cached changes or when the system configuration or usage changes. Also, the evaluation interval can be checked routinely at fixed time intervals and modified or changed as needed. Regularly checking the evaluation interval ensures that the delayed cache does not overreact to rapid changes in usage (i.e., caused by an overly brief evaluation interval) or not adapt to longer term usage patterns (i.e., caused by an inappropriately long evaluation interval).

Figure 3:
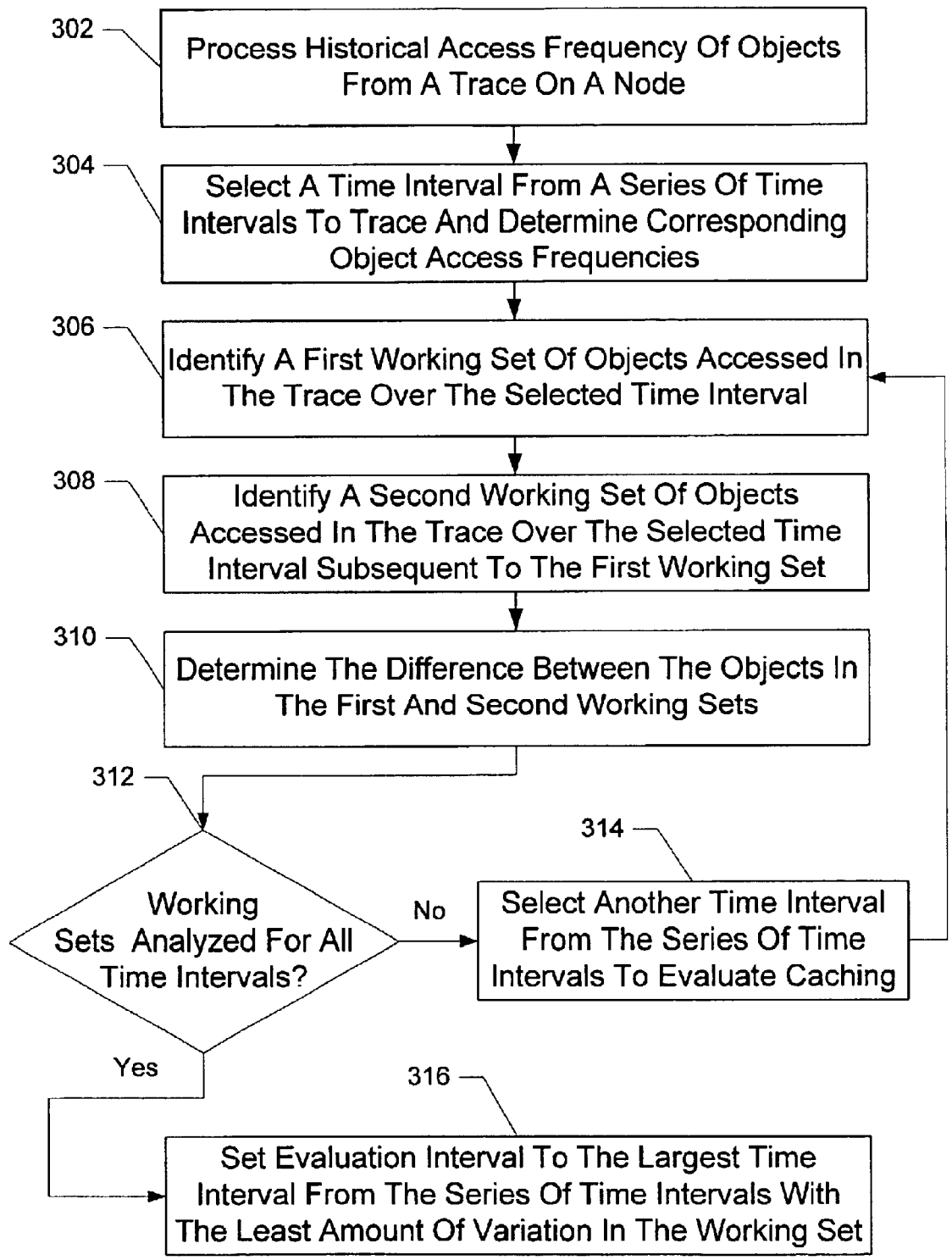
FIG. 3 is another flow chart diagram of the operations associated with determining the evaluation interval for delayed cache in accordance with one implementation of the present invention.

FIG. 3 is another flow chart diagram of the operations associated with determining the evaluation interval in accordance with one implementation of the present invention. This evaluation interval is used by one or more delayed cache to time the update and evaluation of the cache contents. In this implementation, the evaluation interval is based on processing a historical record of the request and access frequency of objects or content (302). The historical access frequency is a trace of the objects requested and/or accessed on one or more nodes over a time period. Each node can be analyzed separately making many separate databases or the request and access information can be collected together into a single file or database and used for collective analysis. In either of these examples or in alternate implementations, the request and access information for the objects and content provides an indication of the request pattern for objects and content in the future.

A series of time intervals is selected for sampling the trace and determining the corresponding access frequencies (304). Analysis of the historical access frequency information is performed by comparing a first time interval from the series of time intervals and with a second time interval from the series of time intervals. For example, a linear series of time intervals may include a 1 minute time interval, a 2 minute time interval, a 3 minute time interval and a 4 minute time interval. Alternatively, the time intervals can be based upon a Fibonacci sequence, an exponential sequence, or based upon many other mathematical relationships. Each time interval is selected for sampling the historical access frequency information and then analyzed as a suitable evaluation interval. Rapid convergence on the correct evaluation interval depends on the series of time intervals selected for evaluation, the range of values within the series of time intervals, and the number of iterations required for convergence on the proper evaluation interval.

In one implementation, a first working set of objects is created from objects accessed or requested in the sample trace over the selected time interval (306). For example, a list of objects accessed during a 3 minute time interval starting at 30 minutes is used to create the objects used in the first working set. A second working set of objects is created subsequently using the same selected time interval (308). In view of the example above, the second working set would include the objects or content accessed during the same 3 minute time interval but starting sometime after the 33 minute point in time the first working set is created.

Once created, the first and second working sets are compared and used to determine the changes in the content and objects requested over time given the two identical time intervals (310). For example, the comparison will indicate whether an object or content requested in the first time interval was also requested during the second time interval. The results of this analysis between the first and second working set using a given time interval is stored and if another time interval needs analysis (312), another time interval is selected from the series of time intervals previously described (314) and the above operations are repeated. For practical reasons, there may only be time enough to evaluate a finite number of time intervals before deciding the most appropriate time interval to use in the delayed caches on the system.

After evaluating the different time intervals, the evaluation interval is selected that spans the largest time interval with the least amount of variation between the first and second working sets (316). In an alternate implementation, the evaluation interval can be selected when the differences between two or more working sets does not exceed a minimum difference threshold amount. For example, a time interval can be used immediately if a comparison between two or more working sets indicates the difference between the content in the working sets does not exceed a minimum threshold. In either of these and other approaches, selecting the right time interval contributes to the proper operation of the delayed cache of the present invention. Too short of a time interval and the delayed cache updates too frequently in response to different requests for objects or content; setting the time interval too long, however, and the cache contents will become stale and ineffective. Of course, with larger time intervals comes the benefit that less overhead is spent sending object lists over a network connection. Accordingly, the evaluation interval is selected from the resulting above analysis with the largest given time interval yet the least amount of variation between the first and second working sets.

Figure 4:
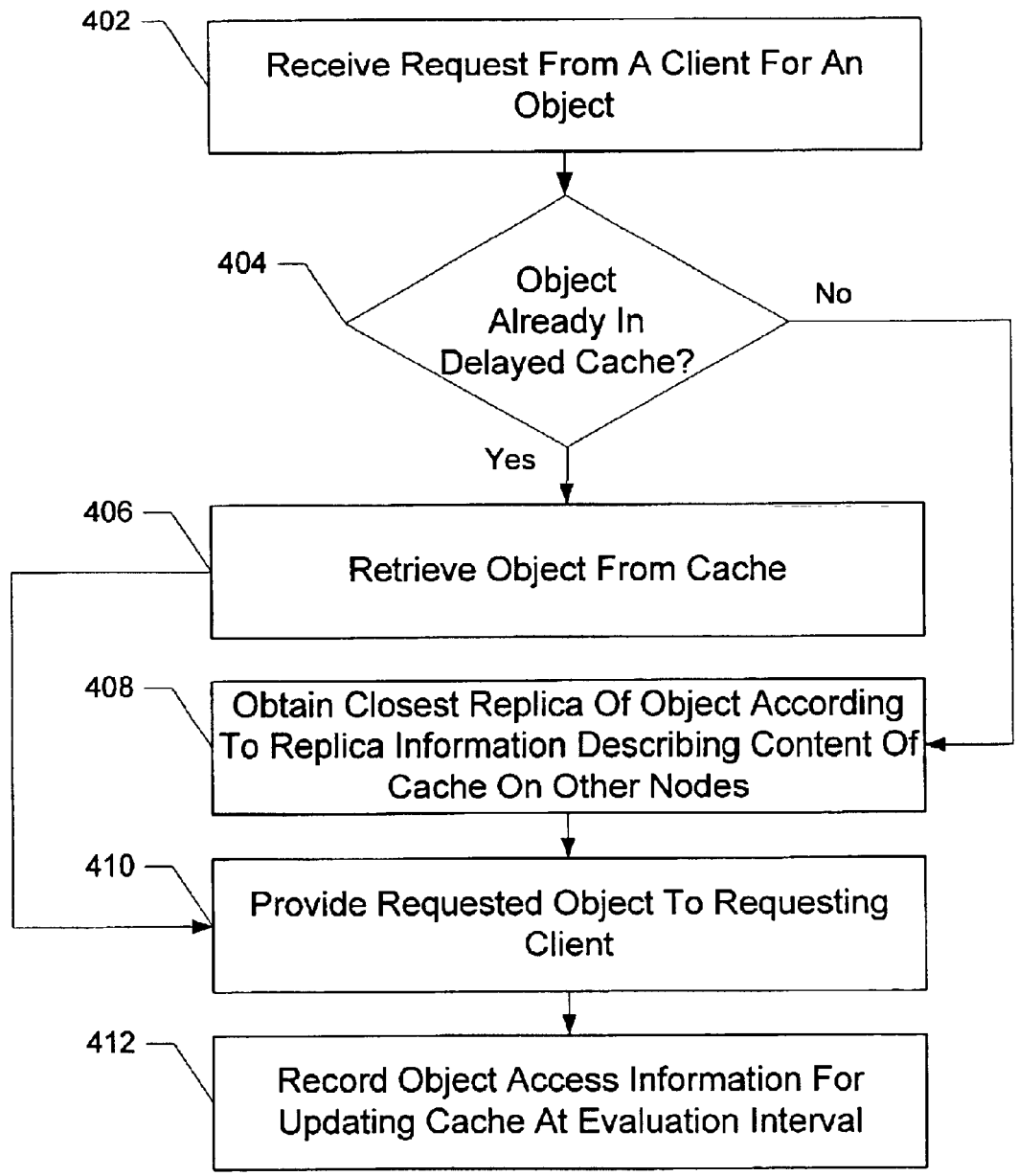
FIG. 4 is a flow chart of the operations used when a delayed cache in accordance with one implementation of the present invention receives a request for an object or content.

FIG. 4 is a flow chart of the operations used when a delayed cache operating in accordance with one implementation of the present invention receives a request for an object or content. Initially, the request comes from a client for an object or content (402) and the node directly receiving the request determines if the delayed cache in the node has the object (404). If the object is in the delayed cache associated with the node (404), the object or content is retrieved directly from the delayed cache (406).

Alternatively, if the delayed cache does not have the object or content then replica information describing the contents of delayed cache on other nodes is used to obtain the nearest replica of the object or content (408). In one implementation, the node acts on behalf of the client requesting the object or content and obtains the object or content from the nearby node. In another implementation, the node directs the client requesting the object or content to another node and delayed cache having the requested information. It is also possible that the requested object or content is not contained in delayed cache but needs to be retrieved from the original node or source of information. Overall, each of these approaches results in providing the requested object or content to the requesting client (410).

Client requests and accesses to the objects are recorded and used later when the delayed cache is updated at the end of the evaluation interval (412). For example, information is recorded during each access or request but the cache evaluations are not performed for evicting content in the delayed cache and replacing with newer content. Rather, these operations are delayed and performed at the evaluation intervals as described above with respect to FIG. 2.

Figure 5:
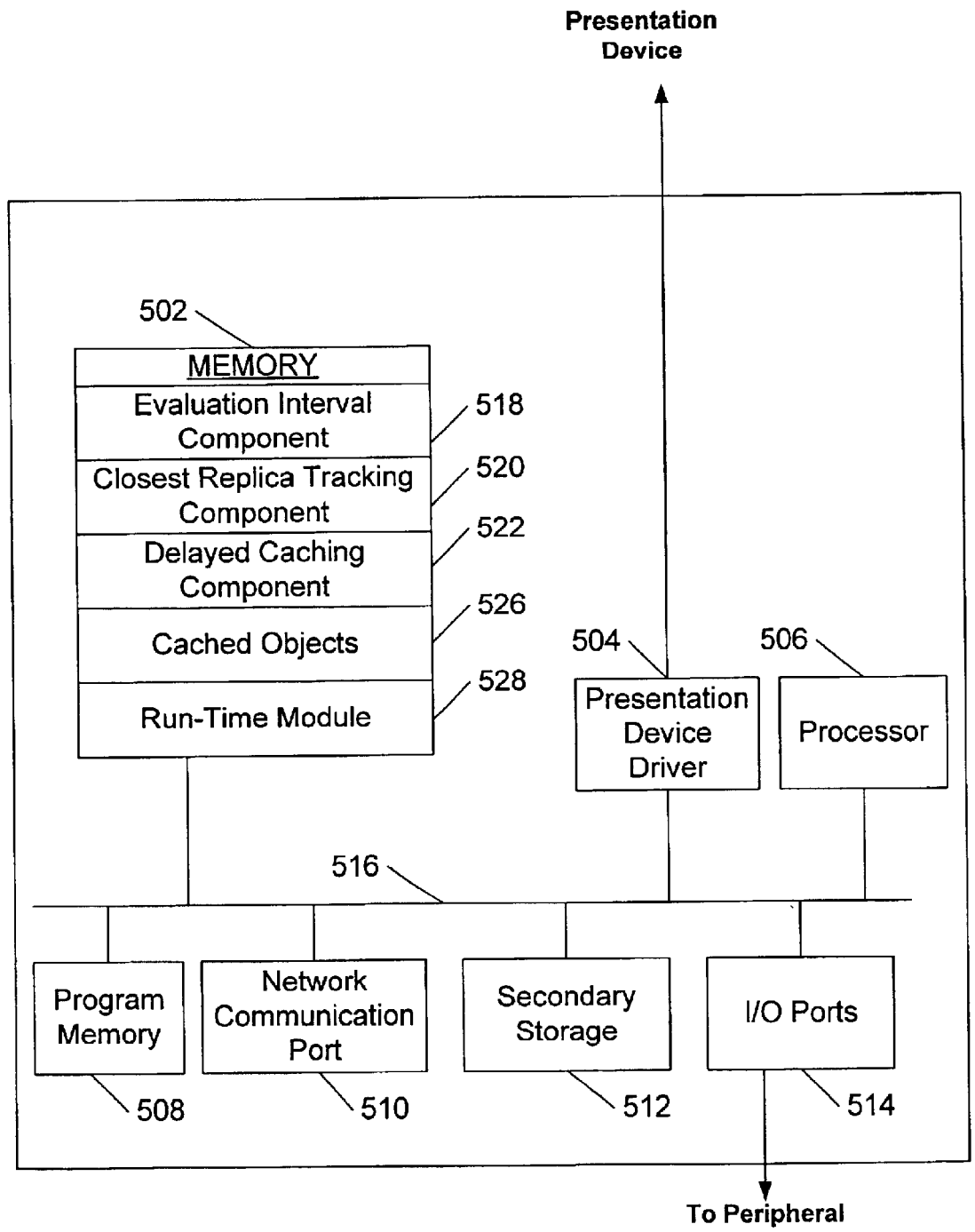
FIG. 5 is a block diagram of a system designed to use delayed cache in accordance with one implementation of the present invention.

FIG. 5 is a block diagram of a system designed to use delayed cache in accordance with one implementation of the present invention. This example system 500 includes a memory 502, typically random access memory (RAM), a presentation driver 504, a processor 506, a program memory 508 (for example, a writable read-only memory (ROM) such as a flash ROM), a network communication port 510, a secondary storage 512, I/O ports 514 operatively coupled together over bus 516. System 500 can be preprogrammed, in ROM, for example, or it can be programmed (and reprogrammed) by loading a program from another source (for example, from a floppy disk, a CD-ROM, or another computer).

Memory 502 includes an evaluation interval component 518, a closest replica tracking component 520, a delayed caching component 522, and cached objects 526. Evaluation interval component 518 analyzes historical trace information associated with accesses and/or requests for objects or content and selects an evaluation interval for the delayed cache.

Closest replica tracking component 520 communicates replica object and content information in delayed cache on system 500 as well as keeping track of objects and content on other nodes and delayed cache. For example, closest replica tracking component 520 determines if the location of an object or content is locally or remotely stored. It also sends out objects lists to other nodes listings the objects and/or content stored in the delayed cache on system 500.

Delayed caching component 522 performs caching in accordance with one implementation of the present invention and also collects information during the interval between evaluations. One portion of delayed caching component 522 tracks and organizes the requests and accesses to objects and content to be used later by implementations of the present invention. Another portion of delayed caching component 522 performs the actual caching operations used in the particular implementation. For example, delayed caching component 522 can be configured to perform a least-recently-used (LRU) caching, a Greedy Dual (GD) Caching, or a Greedy Dual Size (GDS) Caching operation on the delayed cache designed in accordance with aspects of the present invention. Cached objects 526 represents the objects and/or content stored in the delayed cache of the present invention and subject to caching operations as determined by the particular configuration or design.

To facilitate performing these and other operations on system 500, run-time module 528 allocates resources from memory, storage area, and processor time-slices to these and other operations. For example, run-time module 528 can be based on a real-time kernel of an operating system or can be preemptive operating system having fewer real-time operating characteristics.

Presentation driver 504 provides digital and/or analog signal output to an image generation device such as a display or a printer. Processor 506 executes instructions in memory including instructions associated with the various components described previously. Secondary storage 512 is suitable for storing executable computer programs, including programs embodying the present invention, and data including buffers and temporary storage space as need to implement aspects of the present invention.

Input/output (I/O) ports 514 are coupled to system 500 over bus 516. Peripheral devices connected through I/O ports 514 may include audio ports generating analog and/or digital signals amplified for listening over an audio generation device like a speaker. Input/output ports facilitate the receipt and transmission of data (e.g., text, images, videos, and animations) in analog or digital form over communication links such as a serial link, local area network, wireless link, and parallel link. These input/output (I/O) 514 ports also facilitate communication with a wide variety of peripheral devices including keyboards, pointing devices (mouse, touchpad and touchscreen) and printers. Alternatively, separate connections (separate buses) can be used to interface with these peripheral devices using a combination of Small Computer Systems Interface (SCSI), Universal Serial Bus (USB), IEEE 1394/Firewire, Personal Computer Memory Card International Association (PCMCIA) or any other protocol suitable for interfacing with the peripheral device being attached to system 500.

While specific embodiments have been described herein for purposes of illustration, various modifications may be made without departing from the spirit and scope of the invention. Accordingly, the invention is not limited to the above-described implementations, but instead is defined by the appended claims in light of their full scope of equivalents.

What is claimed is:

1. A method of caching objects comprising:
   receiving an evaluation interval to delay updating the objects to be stored in a delay cache;
   delaying a time period corresponding to the evaluation interval; and
   updating the objects stored in the contents of the delay cache when the time period delay has completed.

2. The method of claim 1 further comprising:
   communicating an object list identifying the current objects stored in the delay cache over a network when the contents of the delayed cache have been updated.

3. The method of claim 1 wherein the evaluation interval corresponds to a time period that the delay cache is likely to have one or more objects being requested.

4. The method of claim 3 wherein updating the objects to be stored in the delayd cache is performed in accordance with a caching algorithm.

5. The method of claim 4 wherein the caching algorithm replaces objects in the delay cache according to a caching operation selected from a set of caching operations including: a least recently used (LRU) analysis, a greedy dual analysis (GD), and a greedy dual size (GDS) analysis.

6. The method of claim 1 wherein the time period for the evaluation interval is a single value for one or more delay caches used over a network.

7. The method of claim 1 wherein the time period for the evaluation interval can be different for each of the one or more delay caches used over a network.

8. The method of claim 1 wherein the time period for the evaluation interval can be reset to different values.

9. The method of claim 1 wherein the evaluation interval is determined by analyzing requests for objects over one or more previous time periods and the contents of the delay cache during the one or more time periods.

10. An apparatus for caching objects comprising:
    a storage area configured to receive an evaluation interval to delay updating the objects to be stored in a delay cache;
    a timer that delays a time period corresponding to the evaluation interval; and
    an update component that updates the objects stored in the contents of the delay cache when the timer delaying the time period has completed.

11. The apparatus of claim 10 further comprising:
    a communication component that communicates an object list identifying the current objects stored in the delay cache over a network when the contents of the delayd cache have been updated.

12. The apparatus of claim 10 wherein the evaluation interval corresponds to a time period that the delay cache is likely to have one or more of the objects being requested.

13. A method of caching objects, comprising:
    receiving a request for an object;
    determining if the requested object is in a delay cache;
    retrieving the object from the delay cache based upon the determination, wherein the contents of the delay cache are evaluated according to a caching algorithm after an evaluation interval passes; and
    accessing the object from a neighboring cache associated with a nearby node based upon the determination and according to a cache list.

14. The method of claim 13 further comprising,
    delivering the requested object to the client that made the request.

15. The method of claim 13 wherein the caching algorithm replaces objects in the delay cache according to a caching operation selected from a set of caching operations including: a least recently used (LRU) analysis, a greedy dual analysis (GD), and a greedy dual size (GDS) analysis.

16. The method of claim 13 wherein retrieving the object further includes,
    copying the object from delay cache and providing the results to the requesting client.

17. The method of claim 13 wherein accessing the object further includes directing a client requesting the object to the node and corresponding delay cache having the requested object.

18. The method of claim 13 wherein the neighboring cache is the nearest cache with the requested object.

19. The method of claim 13 wherein the neighboring cache has the fastest response time for the requested object.

20. The method of claim 13 wherein the requested object is retrieved from the original node based on the determination.

* * * * *